(12) United States Patent
Lutz et al.

(10) Patent No.: US 6,185,037 B1
(45) Date of Patent: Feb. 6, 2001

(54) OPTICAL RECONNAISSANCE SYSTEM

(75) Inventors: Reinhold Lutz, Bergen; Wolfgang Holota, Brunnthal, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/238,567

(22) Filed: Jan. 28, 1999

(30) Foreign Application Priority Data

Jan. 28, 1999 (DE) .............................................. 198 03 064

(51) Int. Cl.$^7$ .................................................. G02B 23/00
(52) U.S. Cl. ........................................... 359/399; 359/419
(58) Field of Search ..................... 359/399, 419, 359/429

(56) References Cited

U.S. PATENT DOCUMENTS

| | | | |
|---|---|---|---|
| 4,713,533 | 12/1987 | Bremer et al. | 250/203 R |
| 5,159,489 | * 10/1992 | Massie et al. | 359/419 |
| 5,581,399 | 12/1996 | Abe | 359/410 |
| 5,867,318 | * 2/1999 | Cordier et al. | 359/618 |

FOREIGN PATENT DOCUMENTS

| | | |
|---|---|---|
| 1203010 | 1/1965 | (DE). |
| 3731844 | 3/1989 | (DE). |

OTHER PUBLICATIONS

K. Stahl & G. Miosga, Infrarottechnik—(1986)—p. 222–233.

* cited by examiner

Primary Examiner—Thong Nguyen
Assistant Examiner—Mark A. Robinson
(74) Attorney, Agent, or Firm—Ladas and Parry

(57) ABSTRACT

An optical reconnaissance system for the observation of terrain from a great height, in which a number of individual telescopes are aligned approximately parallel and the detector arrays for the telescopes are disposed in a common focal plane such that during observation, a terrain surface segment imaged on any arbitrary detector element of the detector array of any of the individual telescopes is shifted by a fraction of the width of the detector element, from one detector array to the next. Instead of being parallel, the optical axes of the telescopes can be slightly inclined relative to one another to arrange the detector arrays in the common focal plane adjacent to one another.

8 Claims, 2 Drawing Sheets

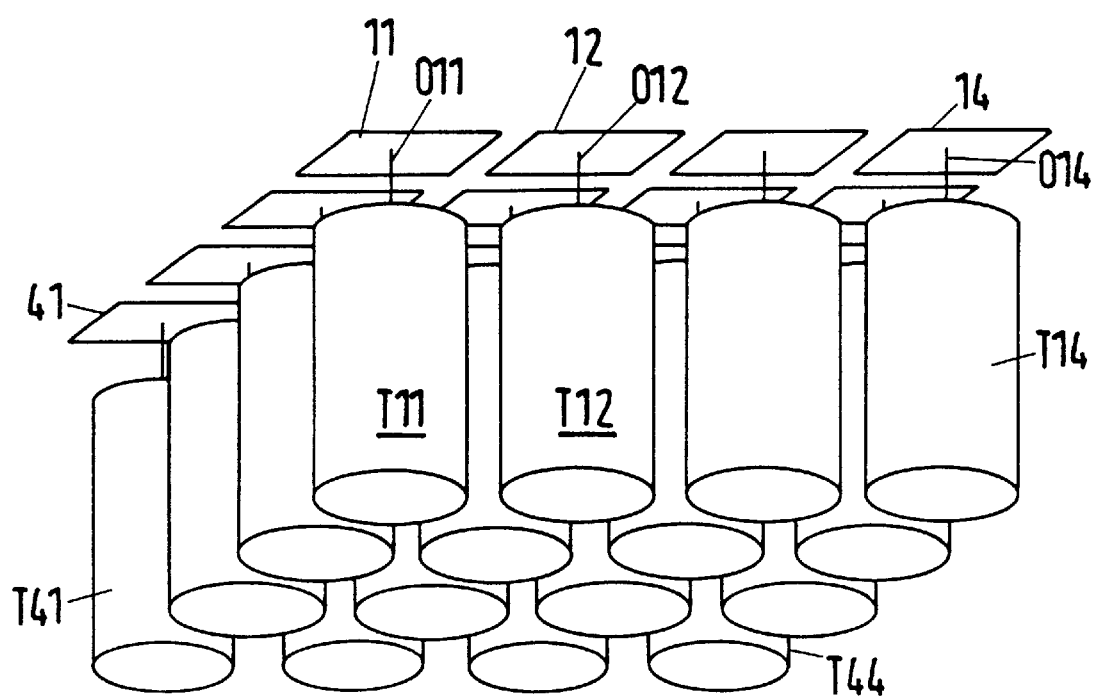

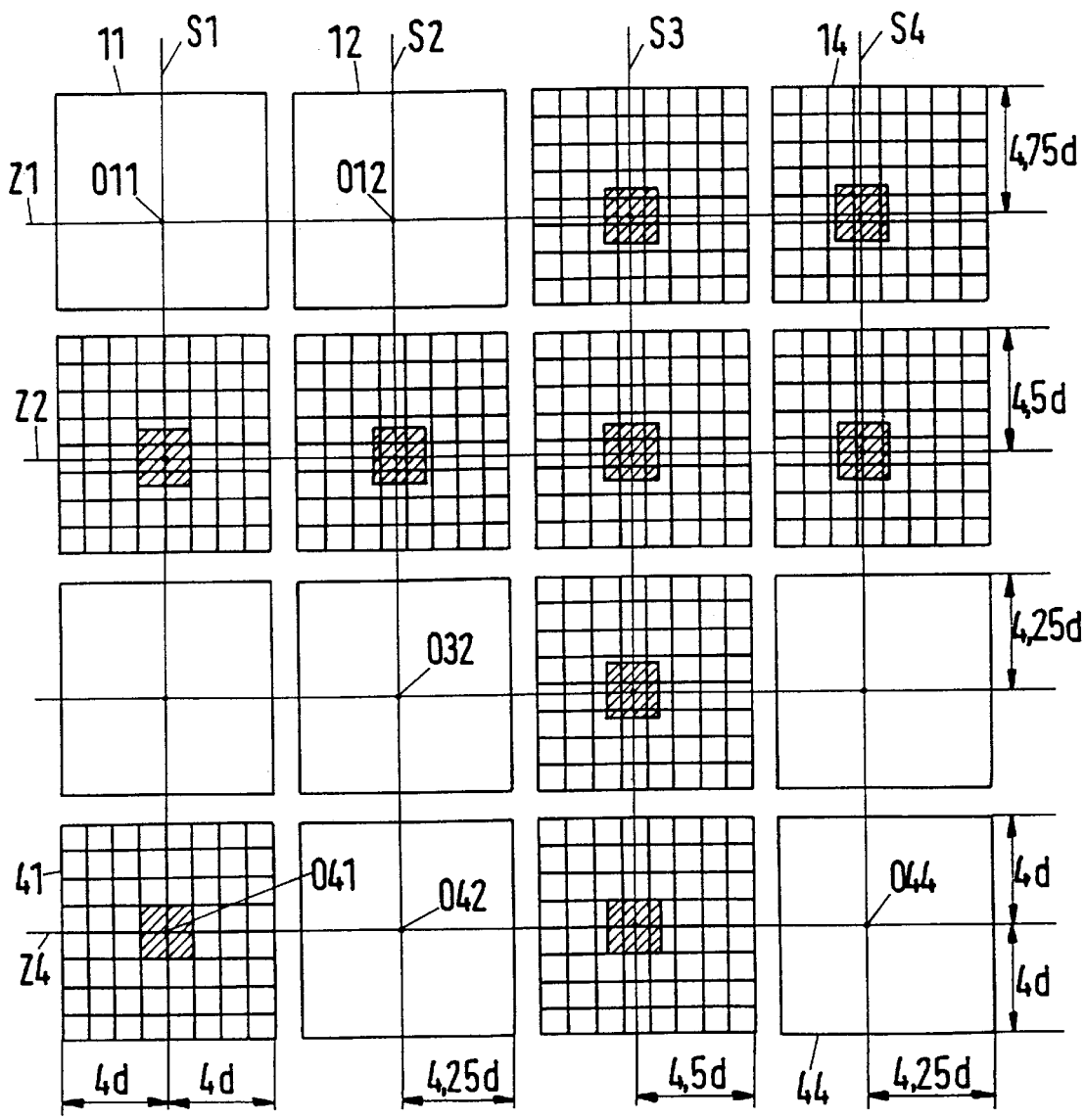

OPTICAL RECONNAISSANCE SYSTEM

FIELD OF THE INVENTION

The invention relates to an optical reconnaissance system for observing terrain from a great height, for example, from a geostationary or a low-flying satellite, or from high altitude aircraft.

BACKGROUND AND PRIOR ART

In conventional systems for optical earth observation in a single spectral channel, only a single telescope with one detector array in its focal plane is used. In order to improve performance, i.e., ground resolution, it was necessary to use telescopes with focal lengths as large as possible and simultaneously with an aperture that was as large as possible, assuming constant altitude and size of the detector element.

As is known, focal length is linearly related to height above the ground as well as to resolution. Hence, a doubling of resolution requires a doubling of the focal length and therefore a doubling of the structural length for the same telescope construction. Aperture size is also linearly related to resolution by diffraction. Therefore, for a higher resolution, the size of the aperture of the telescope objective lens must also be increased.

Further, the size of the objective lens, which serves as the light-collecting surface of the optical system, is dependent on the size of the reflecting terrain surface segment or area for a given signal-to-noise ratio. Thus, if the area of the terrain surface segment being visualized is reduced by half, then, for a constant signal-to-noise ratio as well as for a constant exposure time, the area of the aperture must be doubled. Also, the available exposure time, for example, in the case of a satellite in a low orbit, is proportional to the linear dimension of the terrain surface segment in the flight direction, due to the velocity of the satellite of approximately 7 km per second relative to the ground. If the length of the terrain surface segment in the flight direction is reduced by one-half, the exposure time is also reduced by one-half.

The aperture size thus increases with increasing resolution of the telescope, as does focal length. This increases the volume and mass of the telescope and correspondingly increases costs.

SUMMARY OF THE INVENTION

An object of the invention is to provide an optical reconnaissance system for observation of terrain surface from a great height, which offers a more compact and thus more cost-favorable execution with comparable performance data, when compared with conventional systems.

According to the invention, instead of a single telescope, a number of individual telescopes are employed, which are adapted to the smaller requirements with respect to their focal length, aperture, and thus individual resolution. These individual telescopes are aligned approximately parallel with respect to their optical axes, and they define a detector array in their focal plane, each in the conventional manner. The individual telescopes, however, must be capable of being aligned such that during the terrain observation, the terrain surface segment imaged on an arbitrary detector element of any one of the individual telescopes of the detector array is imaged-shifted in a direction on the detector array relative to at least one other individual telescope, and in fact, by a fraction of the width of one detector element in the focal plane.

By the increasing displacement of the terrain surface segment by one fraction of the detector element width on each detector element, slightly different total information can be obtained from the total assembly of detector arrays of the individual telescopes. The images obtained by means of the individual telescopes each contain different information content, although basically the same terrain segment is considered. The displacement of the terrain surface segment in the focal planes of the individual telescopes can be altered by slightly inclining the optical axes of the individual telescopes relative to one another, or also, by keeping the optical axes of the telescopes parallel and displacing the detector arrays increasingly relative to one another in the respective focal planes with respect to the optical axes. In the first case, there is no displacement of the detector arrays in the focal planes, and as mentioned, the alignment is produced by inclining the optical axes, while in the second case, the optical axes can be aligned parallel to one another.

In principle, it is equally possible to arrange the individual telescopes in a square matrix array in columns and rows, or in a hexagonal array, or without any regular order. It is only important that at least one group can be defined in the total assembly of individual telescopes, in which the individual telescopes are thus aligned or formed relative to the arrangement of their detector arrays such that they can be brought functionally into a sequence with increasing displacement of the image of the terrain surface segment in a direction lying in the focal plane. With respect to this displacement, a higher resolution can then be obtained by means of computer methods, than would be produced from the image of a single telescope. For example, if N individual telescopes are brought into a sequence in the described manner, it is appropriate to carry out their alignment or the arrangement of their detector arrays such that the displacement of the image of the terrain surface segment is produced by 1/N of the width of a detector element from one telescope to the next in sequence.

An increase in the resolution in a second direction lying in the focal plane, for example, perpendicular to the already mentioned first direction, can be achieved in that again at least one other group of individual telescopes can be arranged, such that the above-mentioned displacements of the terrain surface segments can be increasingly produced in the second direction on the sequence of the detector arrays.

Thus, in a particularly simple arrangement, increased resolution can be obtained in two directions orthogonal to each other, by arranging the individual telescopes at equal distances from one another in rows and columns in the array. The increasing displacement of the imaged terrain surface segment is produced both in the column direction and orthogonally in the row direction. Thus, the number of rows can deviate from the number of columns. The fraction of the detector element width, by which the displacement is produced, is then dependent on direction and amount to the reciprocal value of the number of telescopes present in the respective rows or columns. The higher this number, the smaller the size of the shift between adjacent elements, and thus the obtainable resolution is also higher.

In the case of an instrument carrier (satellite or airplane) flying over terrain at a considerable velocity, more telescopes are arranged, for example, in the column direction extending in the flight direction than in the row direction oriented perpendicularly thereto. In a geostationary satellite, on the other hand, a telescope array having the same number of individual telescopes in the row and column directions, is recommended.

The simplest embodiment of the invention operating in two directions orthogonal to one another consists of an array of 4×4 individual telescopes. Such an array with a 30-cm aperture diameter for each individual telescope can replace a single larger telescope with approximately a 1-m aperture diameter. These individual telescopes need to be equipped with only a common focal length to produce a length of side of a square terrain surface segment of 50 cm, the focal length being dimensioned for much reduced resolution, i.e., for a terrain surface segment of 2-m edge length.

Thus, a substantially smaller structural size is obtained, with smaller telescopes of smaller aperture size. Large-mirror telescopes do not need to be used and conventional telescopes with considerably smaller resolution are sufficient. The integration times with respect to the detector arrays are prolonged by a factor of 4 in the above-mentioned simple embodiment. The use of conventional detector arrays achieves a good signal-to-noise ratio.

Increased resolution can be obtained by a computer either on board the airplane or satellite or after transmission to a ground station, by means of semi-interferometric aperture synthesis. Therefore, the superimposition of image information of the individual telescopes is produced incoherently by the computer. This is contrasted with Fourier-optical image reconstruction processes, in which the optical beam paths of the individual telescopes must be overlaid in one focal plane, correct in phase and in amplitude.

As already mentioned, each telescope basically considers the same ground scene or the same terrain segment. Based on the depicted displacement, the terrain segment, however, is scanned somewhat differently by the individual detector elements of the respective arrays of each telescope.

By suitable selection of the size of the detector elements and the spacing between adjacent detector elements as well as the aperture size of each telescope, it is assured that the desired different information content is obtained up to the desired spatial frequency. Without this difference in the information content of the individual images, an increase in resolution could not be achieved and only the signal-to-noise ratio could be improved by incoherent superimposition of the individual images. In order to transfer this different information from the individual images of the telescopes into a total information set, the individual images are superimposed incoherently by a computer according to their geometric shift.

For technically executing the invention, it is not important how the telescopes are produced, whether they are refracting or reflecting; whether an N×N telescopic array is used, which takes up a complete image synchronously, if the focal plane is furnished with matrix detector arrays; whether a one-dimensional arrangement of telescopes is used, which make possible a sequential image construction by a relative movement, for example, four telescopes crosswise to the direction of flight; whether matrix-arranged or linear detector arrays are used; or more than two linear detector arrays with a corresponding geometrical shift crosswise to the flight direction are arranged in the focal plane of the telescopes. In the latter case, the individual images are recorded sequentially in time, corresponding to the shift of the linear detector arrays in the flight direction, in a "push-broom mode", which has as a consequence an increased stability of the arrangement.

BRIEF DESCRIPTION OF THE DRAWING

FIG. 1 diagrammatically illustrates a 4×4 array of individual telescopes according to the invention.

FIG. 2 shows an arrangement of the associated detector arrays in the respective focal planes of the individual telescopes of FIG. 1.

DETAILED DESCRIPTION

FIG. 1 shows an optical reconnaissance system of the invention, which essentially is formed by a square arrangement of 4×4 individual telescopes T11 to T44 with the detector arrays 11, 12, . . . 44 associated respectively therewith, and like the telescopes, are arranged in an array of rows and columns extending at right angles to one another. The optical axes O11, O12, etc. are also illustrated schematically between the individual telescopes and the respective detector arrays.

FIG. 2 shows the detector arrays 11, 12 . . . 44, lying in the focal planes of individual telescopes T11, T12 . . . T44. The points of intersection of optical axes O11, Q12 . . . Q44 on the respective detector arrays are also shown. These lie at the points of intersection of an orthogonal network of rows Z1 to Z4 and columns S1 to S4, which characterizes the structural arrangement of the telescopic array. In several detector arrays, for example, in detector array 41, the detector surface is divided into 8×8 individual detector elements. These detector elements are formed as squares and each has a length of side or width d. In the case of detector array 41, the point of intersection of optical axis O41 lies precisely in the center and the length of a side of detector array 41 is 8d. The shaded region around the center of the detector 41 symbolizes in two dimensions a total of four detector elements imaging a terrain surface segment, whose dimensions on the ground are determined by the size of the respective detector elements, taking into consideration the focal length of the telescope and the altitude of the carrier above the ground.

Proceeding from detector array 41, a displacement or a shift of the detector array can be noted in the direction of row Z4 to detector element 44, relative to the respective optical axes, and in fact each detector array is spaced from the next by $¼^{th}$ of the width of each detector element. A corresponding displacement of the detector arrays is also present in the direction of the columns. The increasing displacements in the column and row directions are also shown in detail on the basis of row Z2 and column S3. It is shown that the four terrain surface segments, which are coincident with the four central detector elements in detector array 41 are imaged at progressively increasing offset distances to extend over more than four detector elements. Namely, in rows Z1–Z3 in column S1 and in row Z4 six detector elements are imaged while in the other detector arrays nine detector elements are imaged.

Thus, the precise distribution proportional to the surface of a terrain surface segment are imaged in detector array 41, on the detector elements of each individual detector array in a different way. Each individual one of the four terrain surface segments, for example, imaged in detector array 41 centered around optical axis O41, is similarly imaged in the respective three other detector arrays of column S1 or of row Z4 onto two adjacent detector elements, and with modified surface components. Each of these four terrain surface segments can thus be imaged on up to nine detector elements and differently for the detector arrays.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An optical reconnaissance system for viewing terrain from a great height, said optical system comprising:
   a plurality of telescopes having respective focal planes disposed in a common focal plane, a detector array for each telescope disposed in said common focal plane, said telescopes being arranged adjacent to one another to provide an image of a segment of the terrain being viewed in the detector arrays of the telescopes, the images of said segment in the detector arrays being relatively shifted in said arrays, said telescopes being arranged in at least one row and the shift of the images of said segment being a fraction of a width dimension of a detector element of the detector arrays and being inversely proportional to the number of detector arrays in said at least one row.

2. A system as claimed in claim 1, wherein said telescopes have optical axes which are parallel to one another.

3. A system as claimed in claim 1, wherein said telescopes are arranged in a plurality of rows and said images are shifted relative to one another both in each row and in adjacent rows.

4. A system as claimed in claim 3, wherein said rows of telescopes are arranged to form columns of said detector arrays, said rows and columns being perpendicular to one another.

5. A system as claimed in claim 1, wherein said telescopes have optical axes which are slightly inclined relative to one another.

6. A system as claimed in claim 5, wherein the telescopes in said at least one row are tilted in progressively increasing amounts in the same direction in said at least one row.

7. A system as claimed in claim 6 wherein said telescopes are arranged to produce a plurality of rows and the telescopes are tilted relative to one another from one row to the next.

8. A system as claimed in claim 7, wherein said detector arrays are formed in rows and columns perpendicular to one another.

\* \* \* \* \*